(12) United States Patent
Onaka

(10) Patent No.: US 8,624,869 B2
(45) Date of Patent: Jan. 7, 2014

(54) TOUCH PANEL

(75) Inventor: Eiichi Onaka, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 463 days.

(21) Appl. No.: 12/946,006

(22) Filed: Nov. 15, 2010

(65) Prior Publication Data

US 2011/0141058 A1    Jun. 16, 2011

(30) Foreign Application Priority Data

Dec. 14, 2009    (JP) ................................ 2009-283320

(51) Int. Cl.
*G06F 3/045* (2006.01)
*G06F 3/041* (2006.01)
*H01H 1/10* (2006.01)

(52) U.S. Cl.
USPC ............................ 345/174; 345/173; 200/512

(58) Field of Classification Search
USPC ................................................ 345/173–178
See application file for complete search history.

(56) References Cited

U.S. PATENT DOCUMENTS

| | | | |
|---|---|---|---|
| 5,691,092 A * | 11/1997 | Ninomiya et al. | 430/20 |
| 6,369,803 B2 * | 4/2002 | Brisebois et al. | 345/173 |
| 6,847,355 B1 * | 1/2005 | Nishikawa et al. | 345/173 |
| 7,019,734 B2 | 3/2006 | Cross et al. | |
| 7,034,808 B2 * | 4/2006 | Sakata et al. | 345/173 |
| 7,196,281 B2 * | 3/2007 | Cok et al. | 200/512 |
| 2004/0012570 A1 * | 1/2004 | Cross et al. | 345/173 |
| 2008/0100590 A1 * | 5/2008 | Hur et al. | 345/173 |
| 2008/0246708 A1 | 10/2008 | Ishiguro | |
| 2009/0059157 A1 * | 3/2009 | Haseba et al. | 349/182 |
| 2009/0262093 A1 * | 10/2009 | Ma et al. | 345/174 |
| 2010/0026659 A1 * | 2/2010 | Long et al. | 345/174 |

FOREIGN PATENT DOCUMENTS

| | | |
|---|---|---|
| CN | 1668993 A | 9/2005 |
| CN | 101281313 A | 10/2008 |
| JP | 1-281622 A | 11/1989 |
| JP | 8-063274 A | 3/1996 |
| JP | 2002-149085 A | 5/2002 |
| JP | 2002-287902 A | 10/2002 |

(Continued)

OTHER PUBLICATIONS

Chinese Office Action dated Oct. 30, 2012 (and English translation thereof) in counterpart Chinese Application No. 201010587870.5.

(Continued)

*Primary Examiner* — Alexander Eisen
*Assistant Examiner* — Amit Chatly
(74) *Attorney, Agent, or Firm* — Holtz, Holtz, Goodman & Chick, PC

(57) ABSTRACT

A touch panel includes a first transparent substrate and a second transparent substrate which are bonded by a frame-shaped seal member. One of a surface of the first transparent substrate and a surface of the second transparent substrate is a protrusion formation surface, and the other is a protrusion facing surface. On the protrusion formation surface, protrusions and a first resistive film are formed. The first resistive film includes first contact regions covering tops of the protrusions. On the protrusion facing surface, a second resistive film that includes second contact regions facing the first contact regions is formed. The protrusion formation surface or the protrusion facing surface includes a void region where the resistive film is not formed. Insulating spacers regulate a given distance between the first contact regions and the second contact regions. A space between the first and second transparent substrates contains an insulating liquid.

20 Claims, 9 Drawing Sheets

(56) References Cited

FOREIGN PATENT DOCUMENTS

| JP | 2005-533323 | A | 11/2005 |
|----|-------------|---|---------|
| JP | 2006-506708 | A | 2/2006 |
| JP | 2006-079635 | A | 3/2006 |
| JP | 2007-058070 | A | 3/2007 |
| JP | 2008-065302 | A | 3/2008 |
| JP | 2009-086184 | A | 4/2009 |
| WO | WO 2004/010277 | A1 | 1/2004 |

OTHER PUBLICATIONS

Japanese Office Action dated Jan. 8, 2013 (and English translation thereof) in counterpart Japanese Application No. 2009-283320.

* cited by examiner

US 8,624,869 B2

TOUCH PANEL

CROSS-REFERENCE TO RELATED APPLICATIONS

This application is based upon and claims the benefit of priority from prior Japanese Patent Application No. 2009-283320, filed Dec. 14, 2009, the entire contents of which are incorporated herein by reference.

BACKGROUND OF THE INVENTION

1. Field of the Invention

The present invention relates to a touch panel, and more particularly, it relates to a resistive touch panel.

2. Description of the Related Art

In general, a touch panel of a resistive film type comprises a press-side resistive film and a rear resistive film which are respectively provided on the opposite surfaces of a press-side substrate and a rear substrate arranged to face each other with a gap. When pressed from the side opposite to the surface in which the press-side resistive film is formed, the press-side substrate bends, resulting in that press-side resistive film and the rear resistive film come into local contact. As a result, electrical conduction is permitted between the press-side resistive film and the rear resistive film at their contact point. In the resistive touch panel, a voltage is alternately applied across both ends of the press-side resistive film and across both ends of the rear resistive film, and the position of the contact point is detected on the basis of the conduction at the contact point.

In the resistive touch panel, as disclosed in, for example, Jpn. Pat. Appln. KOKAI Publication No. 2006-506708, the gap between the press-side resistive film and the rear resistive film are regulated by a plurality of spacers or an insulating liquid is hermetically contained in the gap between the press-side resistive film and the rear resistive film in order to prevent contact between the press-side resistive film and the rear resistive film when there is no input, i.e., when there is no pressing.

BRIEF SUMMARY OF THE INVENTION

According to an aspect of the invention, a touch panel includes a first transparent substrate; a second transparent substrate facing the first transparent substrate; protrusions formed on a protrusion formation surface, the protrusion formation surface being one of a surface of the first transparent substrate facing the second transparent substrate and a surface of the second transparent substrate facing the first transparent substrate; a first resistive film formed on the protrusion formation surface, the first resistive film covering the protrusions; a second resistive film formed on a protrusion facing surface, the protrusion facing surface being the other of the surface of the first transparent substrate facing the second transparent substrate and the surface of the second transparent substrate facing the first transparent substrate; insulating spacers which regulate a given distance between first contact regions and second contact regions to set a gap between the first contact regions and the second contact regions when the first transparent substrate is not pressed, and to allow the first contact regions and the second contact regions to be in contact with each other when the first transparent substrate is pressed, the first contact regions being parts of the first resistive film and including tops of the protrusions, the second contact regions being parts of the second resistive film and facing the first contact regions; a frame-shaped seal member which circumferentially bonds the first transparent substrate and the second transparent substrate together; and an insulating liquid contained in a space surrounded by the first transparent substrate, the second transparent substrate and the seal member, wherein at least one of the first resistive film and the second resistive film has a lattice shape such that the corresponding one of the protrusion formation surface and the protrusion facing surface, on which said lattice-shaped resistive film is formed, includes a void region in which said lattice-shaped resistive film is not formed, the protrusions and the insulating spacers are located only at intersections of the lattice of said lattice-shaped resistive film, and the void region is neither the first contact region nor the second contact region, and is surrounded by said lattice-shaped resistive film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
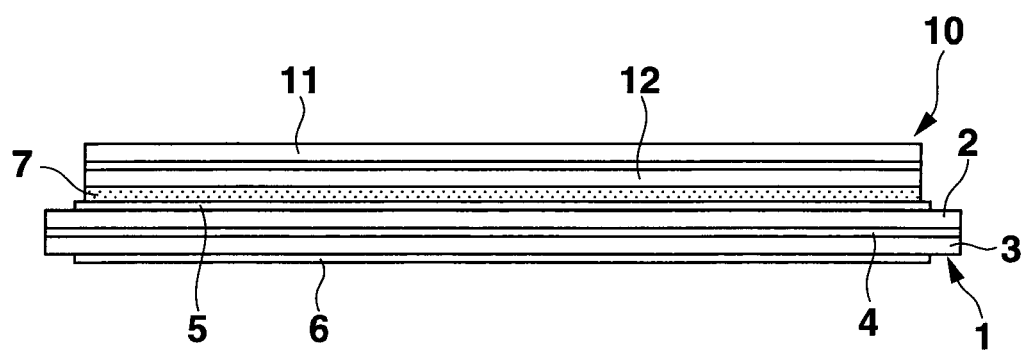
FIG. 1 is a side view showing an example of the configuration of a touch-panel-equipped display device according to one embodiment of the present invention.

One embodiment of the present invention is described with reference to the drawings. As shown in a side view of FIG. 1, a touch-panel-equipped display device including a touch panel according to the embodiment comprises a display panel 1 for image display, and a resistive touch panel 10 disposed on the observation side of the display panel 1.

The display panel 1 is, for example, a liquid crystal display panel. The display panel 1 includes an observation side transparent substrate 2 and a rear substrate 3 which are arranged to face each other with a predetermined gap and which are joined together via a frame-shaped seal member 4 on their peripheral edges. An unshown transparent common electrode is formed on the surface of the observation side transparent substrate 2 facing the rear substrate 3. Transparent electrodes for forming a plurality of unshown pixels are provided on the surface of the rear substrate 3 facing the observation side transparent substrate 2. Unshown liquid crystal is hermetically contained in a region which is a gap between the observation side transparent substrate 2 and the rear substrate 3 and which is surrounded by the seal member 4. The display panel 1 also includes an observation side polarizing plate 5 and a rear polarizing plate 6 arranged on the outer surfaces of the observation side transparent substrate 2 and the rear substrate 3, respectively.

This liquid crystal display panel may be a twisted nematic type, super-twisted nematic type, nontwisted homogeneous type, homeotropic alignment type, bend alignment type, ferroelectric or antiferroelectric liquid crystal display panel. Moreover, the display panel is not exclusively provided with the electrodes for forming a plurality of pixels on each of the opposite surfaces of a pair of substrates. The display panel may be an in-plane electric field control display panel. This type of display panel is provided with a first electrode for forming a plurality of pixels on the surface of one of a pair of substrates, and a plurality of second electrodes formed to be insulated from the first electrode. An in-plane electric field (electric field directed along the surface of the substrate) is produced across the electrodes to change the alignment of liquid crystal molecules. In addition, the display panel 1 is not exclusively the liquid crystal display panel, and may be, for example, an organic electroluminescent (EL) display panel.

The touch panel 10 includes a detection side transparent substrate 11 as a first transparent substrate, and a rear transparent substrate 12 as a second transparent substrate. The observation side polarizing plate 5 of the display panel 1 and the rear transparent substrate 12 of the touch panel 10 are bonded together by a bonding layer 7 made of a transparent adhesive material or resin.

The configuration of the touch panel 10 is further described. The detection side transparent substrate 11 is, for example, a glass plate or resin film formed into a rectangular shape. The rear transparent substrate 12 is, for example, a glass plate formed into a rectangular shape having the same size as the detection side transparent substrate 11.

Figure 2:
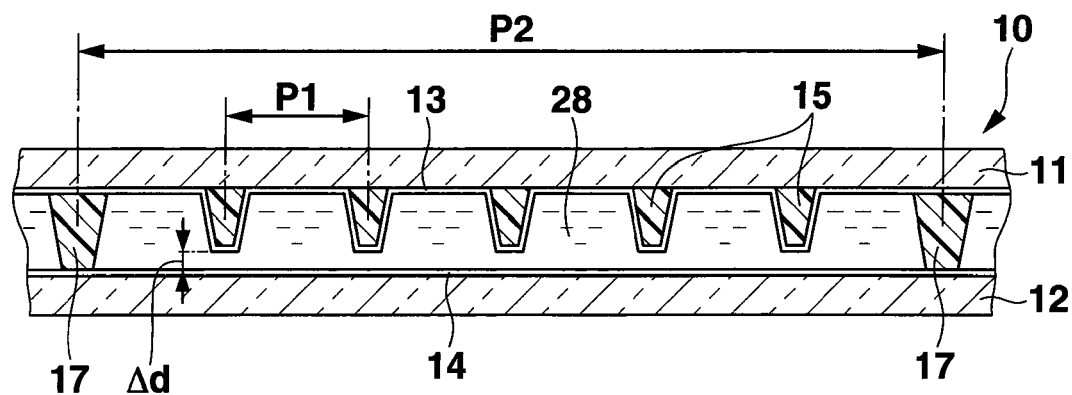
FIG. 2 is an enlarged sectional view showing an example of the configuration of a touch panel according to the embodiment of the present invention.

As shown in a sectional view of FIG. 2, a rear resistive film 14 as a second resistive film is formed on the surface of the rear transparent substrate 12 of the touch panel 10 facing the detection side transparent substrate 11. A plurality of protrusions 15 are formed on the surface of the detection side transparent substrate 11 facing the rear transparent substrate 12. The protrusions 15 are made of a transparent insulator, and arranged with a pitch P1 in perpendicular two directions within a plane. All of the protrusions 15 are equal in height (vertical length in FIG. 2). A detection side resistive film 13 as a first resistive film is formed on the detection side transparent substrate 11 to cover the protrusions 15. The detection side resistive film 13 and the rear resistive film 14 are formed over a wider range than a touch area for touch input. Although not shown, $SiO_2$ films are formed on the entire surfaces of the detection side transparent substrate 11 and the rear transparent substrate 12, the surfaces facing each other. On the $SiO_2$ films, the detection side resistive film 13 and the rear resistive film 14 are formed. The detection side resistive film 13 and the rear resistive film 14 are made of, for example, indium tin oxide (ITO).

Furthermore, with a pitch P2, the protrusions 15 on the detection side transparent substrate 11 are not formed. Instead, transparent insulating spacers 17 are formed at these positions on the detection side resistive film 13. All of the insulating spacers 17 are equal in height (vertical length in FIG. 2). Here, the insulating spacers 17 are greater in height than the protrusions 15. Therefore, when the detection side transparent substrate 11 and the rear transparent substrate 12 are superposed on each other so that the detection side resistive film 13 and the rear resistive film 14 face each other, the tops of the insulating spacers 17 come into contact with the rear resistive film 14, and the two substrates are set parallel to each other. A gap $\Delta d$ corresponding to the difference of height between the protrusions 15 and the insulating spacers 17 is formed between the rear resistive film 14 and the detection side resistive film 13 formed on the tops of the protrusions 15. The gap $\Delta d$ is, for example, about 1 μm. As will be described later in detail, the detection side transparent substrate 11 and the rear transparent substrate 12 are bonded together by a seal member applied to the circumferences of the two substrates in a frame shape. A space formed by being surrounded by the detection side resistive film 13, the rear resistive film 14 and the seal member is filled with an insulating liquid 28.

The protrusions 15 and the insulating spacers 17 are formed by applying a transparent light-curing resin with a predetermined thickness and exposing and developing the resin film. Thus, in order to develop the exposed resin film, the side of the resin film that is closer to the film surface is exposed to a developing solution for a longer time. Accordingly, both of the protrusions 15 and the insulating spacers 17 are formed into a shape that decreases in diameter from the base portions toward the protruding ends.

Although the protrusions 15 and the insulating spacers 17 are shown to be emphasized in height in FIG. 2, the inclination angle (the angle to the surface of the detection side transparent substrate 11) of the circumferential surfaces of the protrusions 15 and the insulating spacers 17 is, for example, 40 to 50°. Thus, the detection side resistive film 13 can be formed to cover the protrusions 15.

The tops of the protrusions 15 and the insulating spacers 17 are circular, and the surfaces of the tops are parallel to the detection side transparent substrate 11. The diameter of the base portion of the protrusion 15 is, for example, 15 or 30 μm. The height of the protrusion 15 is, for example, 2.0 μm. The diameter of the base portion of the insulating spacer 17 is, for example, 30 μm. The height of the insulating spacer 17 is, for example, 2.5, 3.0 or 4.0 μm.

Figure 3:
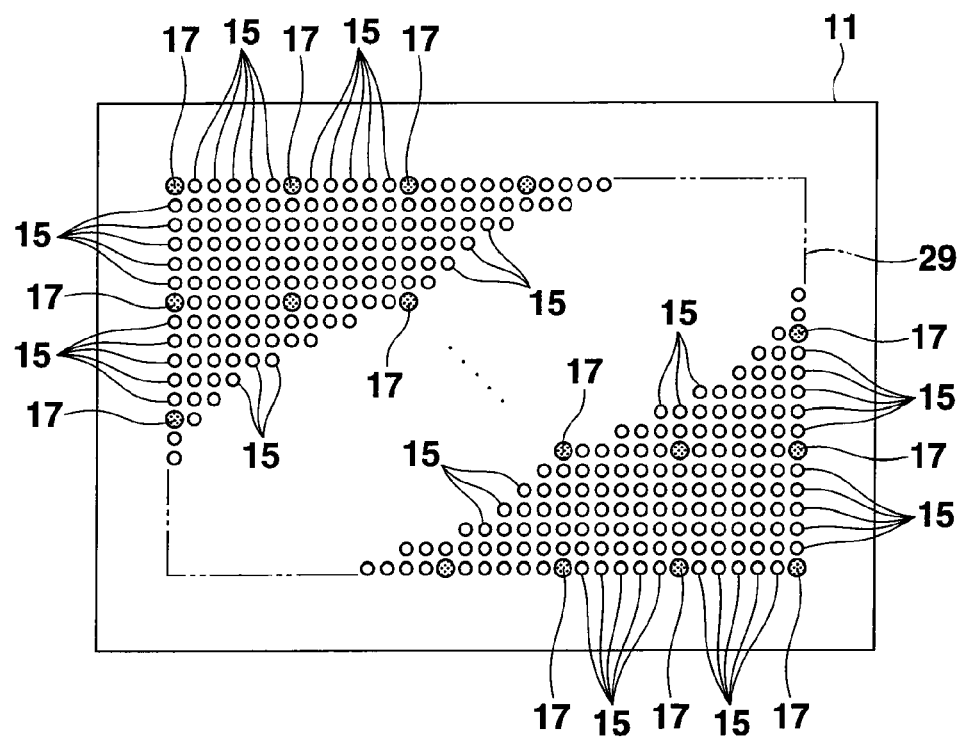
FIG. 3 is a planar view illustrating an example of the arrangement of protrusions and insulating spacers in the touch panel according to the embodiment of the present invention.

An example of the arrangement of the protrusions 15 and the insulating spacers 17 in the detection side transparent substrate 11 of the touch panel 10 having the configuration described above is shown in FIG. 3. In FIG. 3, the protrusions 15 are shown in white circles and the insulating spacers 17 are shown in black circles so that the protrusions 15 can be easily differentiated from the insulating spacers 17. As shown in this figure, the protrusions 15 are arranged with the predetermined pitch P1 in the horizontal and vertical directions in a touch area 29 for touch input, and the protrusions 15 are replaced with the insulating spacers 17 with the predetermined pitch P2. Pitch P1 of the protrusions 15 is, for example, 0.05, 0.1 or 0.2 mm. Pitch P2 of the insulating spacers 17 is, for example, 2 or 4 mm.

In the configuration shown in FIG. 3, for the sake of simplicity, there are five protrusions 15 between the insulating spacers 17 in the horizontal and vertical directions. However, when P1=0.05 mm and P2=2 mm, one insulating spacer 17 is disposed for 39 protrusions 15. When P1=0.2 mm and P2=4 mm, one insulating spacer 17 is disposed for 19 protrusions 15.

When the touch panel 10 is pressed from the side of the detection side transparent substrate 11, the detection side transparent substrate 11 bends, and the detection side resistive film 13 on the top of the protrusion 15 comes into contact with the rear resistive film 14 on the rear transparent substrate 12. As a result, electrical conduction is permitted between the detection side resistive film 13 and the rear resistive film 14 at their contact portions. The touch panel 10 detects the pressed position on the basis of the electrical conduction as will be described in detail later.

Figure 4:
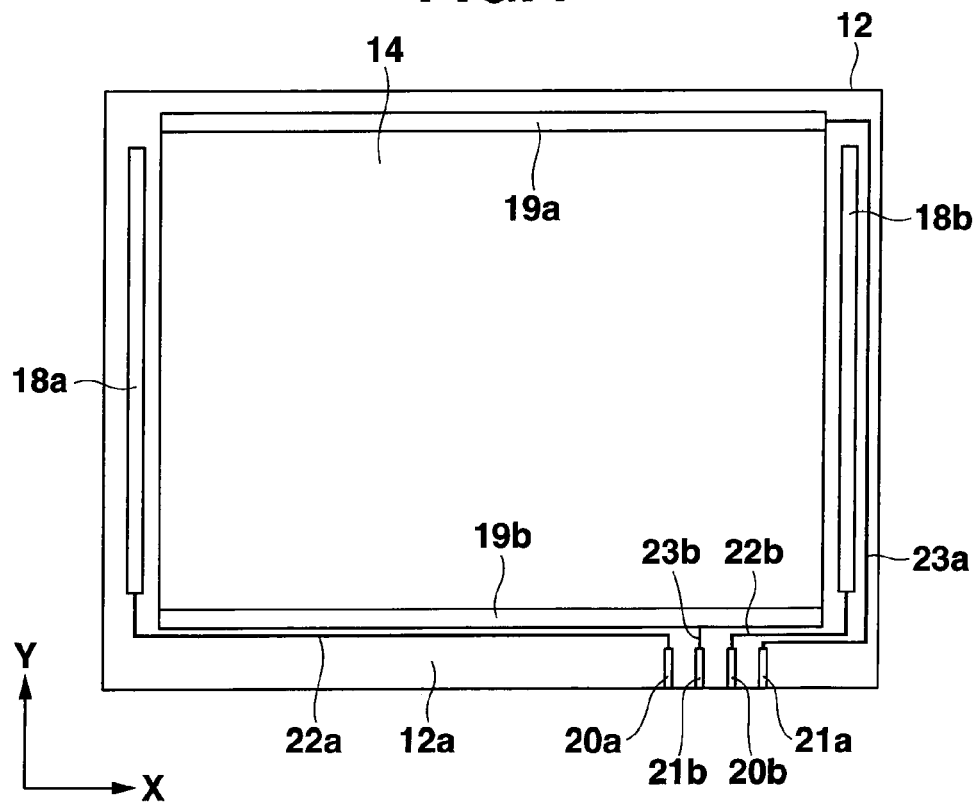
FIG. 4 is a planar view illustrating an example of interconnects in the touch panel according to the embodiment of the present invention.

As shown in FIG. 4, the horizontal direction of the touch area 29 in FIG. 4 is defined as an X-direction, and the vertical direction is a Y-direction. A stripe-shaped upper-end electrode 19a and lower-end electrode 19b are formed on the edges at both ends in the Y-direction of the rear resistive film 14 formed in the rear transparent substrate 12. The length of the upper-end electrode 19a and the lower-end electrode 19b in the X-direction is coincident with the width of the rear resistive film 14 in the X-direction.

A stripe-shaped left-end electrode 18a and right-end electrode 18b are formed on the rear transparent substrate 12 at positions corresponding to edges at both ends in the X-direction of the detection side resistive film 13 formed in the detection side transparent substrate 11. The length of the left-end electrode 18a and right-end electrode 18b in the Y-direction is coincident with the width of the detection side resistive film 13 in the Y-direction.

The upper-end electrode 19a, the lower-end electrode 19b, the left-end electrode 18a and the right-end electrode 18b are connected to an upper-end electrode drive circuit connecting terminal 21a, a lower-end electrode drive circuit connecting terminal 21b, a left-end electrode drive circuit connecting terminal 20a and a right-end electrode drive circuit connecting terminal 20b, respectively, via an upper-end electrode interconnect 23a, a lower-end electrode interconnect 23b, a left-end electrode interconnect 22a and a right-end electrode interconnect 22b, respectively. The upper-end electrode drive circuit connecting terminal 21a, the lower-end electrode drive circuit connecting terminal 21b, the left-end electrode drive circuit connecting terminal 20a and the right-end electrode drive circuit connecting terminal 20b are provided in a overhang 12a of the rear transparent substrate 12 that stretches outward when the detection side transparent substrate 11 and the rear transparent substrate 12 are bonded together. These terminals serve to connect to a later-described touch panel drive circuit.

Each of the upper-end electrode 19a, the lower-end electrode 19b, the left-end electrode 18a and the right-end electrode 18b described above has a continuous stripe. Alternatively, each of these electrodes may be discontinuous. In this case, the upper-end electrode interconnect 23a, the lower-end electrode interconnect 23b, the left-end electrode interconnect 22a and the right-end electrode interconnect 22b are respectively connected to the upper-end electrode 19a, the lower-end electrode 19b, the left-end electrode 18a and the right-end electrode 18b that are discontinuous.

The upper-end electrode 19a, the lower-end electrode 19b, the left-end electrode 18a, the right-end electrode 18b, the upper-end electrode interconnect 23a, the lower-end electrode interconnect 23b, the left-end electrode interconnect 22a, the right-end electrode interconnect 22b, the upper-end electrode drive circuit connecting terminal 21a, the lower-end electrode drive circuit connecting terminal 21b, the left-end electrode drive circuit connecting terminal 20a and the right-end electrode drive circuit connecting terminal 20b are formed on the rear transparent substrate 12 or the rear resistive film 14 by stacking and patterning, for example, a first layer made of molybdenum, a second layer made of an aluminum alloy and a third layer made of molybdenum.

Figure 5A:
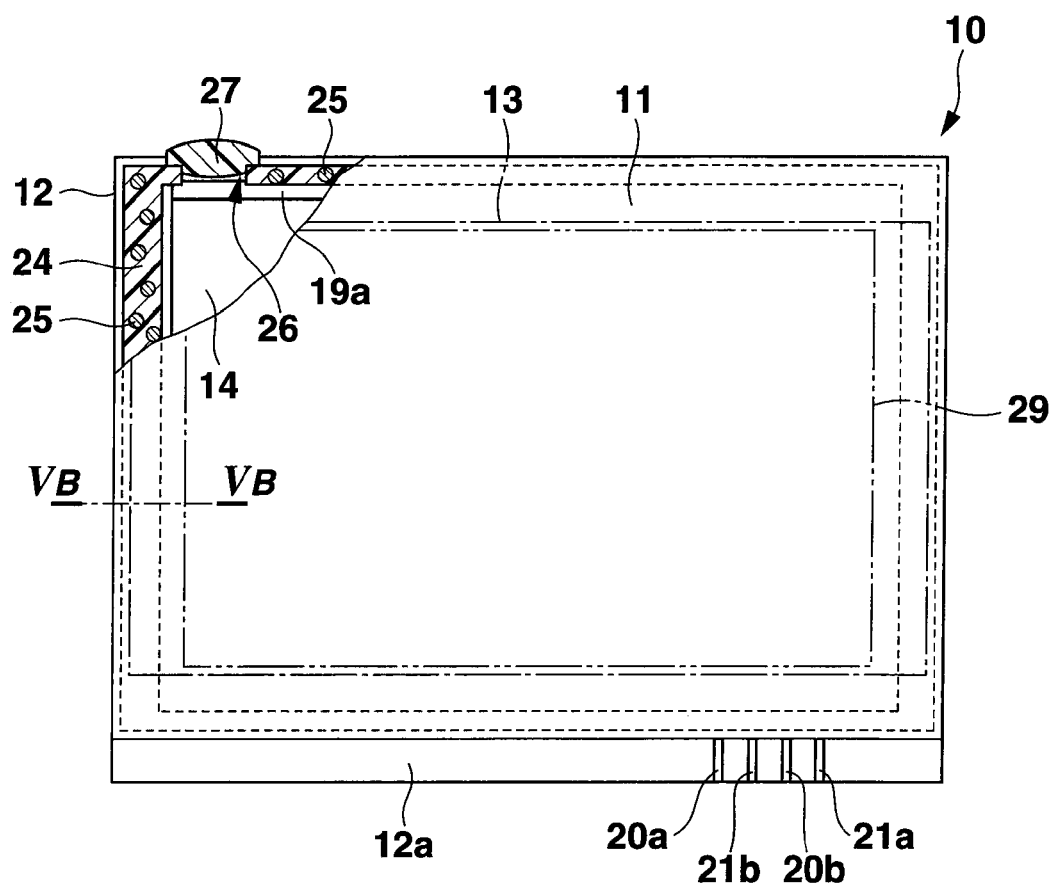
FIG. 5A is a planar view illustrating an example of the bonding of substrates of the touch panel according to the embodiment of the present invention.
Figure 5B:
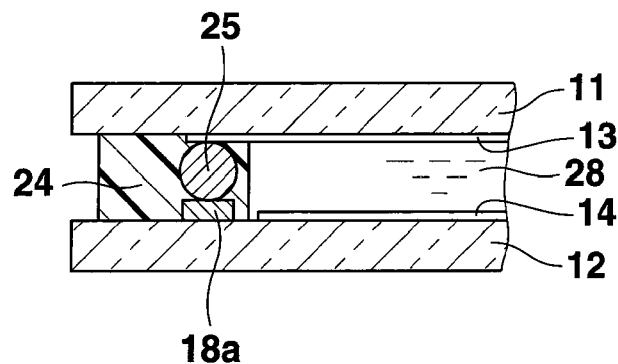
FIG. 5B is a sectional view showing an example of portion VB-VB in FIG. 5A.

A portion on the edge of the touch panel 10 in which the detection side transparent substrate 11 and the rear transparent substrate 12 are bonded together is described. The detection side transparent substrate 11 and the rear transparent substrate 12 are bonded together by a seal member 24. This bonding portion is shown in FIGS. 5A and 5B. FIG. 5A is a planar view and FIG. 5B is a sectional view of portion VB-VB in FIG. 5A. The seal member 24 includes spherical conducting particles 25 having a diameter corresponding to the height of the insulating spacer 17. The seal member 24 including the conducting particles 25 is located to edge the detection side transparent substrate 11. A liquid injection opening 26 is made in a part of the side that faces the overhang 12a of the rear transparent substrate 12.

The gap between the detection side transparent substrate 11 and the rear transparent substrate 12 when bonded together is regulated by the height of the insulating spacers 17 and the diameter of the conducting particles 25. As a result, the detection side transparent substrate 11 and the rear transparent substrate 12 are bonded together in parallel.

The sides at both ends of the detection side resistive film 13 on the detection side transparent substrate 11 in the X-direction are located to overlap the seal member 24. The sides at both ends of the detection side resistive film 13 in the Y-direction are located inside a seal portion where the seal member 24 is present (on the side of the touch area 29). The left-end electrode 18a and the right-end electrode 18b that respectively face the sides at both ends of the detection side resistive film 13 in the X-direction are Provided in the seal portion. As a result of such location, the sides at both ends of the detection side resistive film 13 in the X-direction are electrically connected to the left-end electrode 18a and the right-end electrode 18b via the conducting particles 25 in the seal member 24, as shown in FIG. 5B.

Although the conducting particles 25 described above are spherical particles, the conducting particles 25 may be replaced with columnar conducting members having a height corresponding to the height of the insulating spacer 17. In this case, the columnar conducting members are formed in the sides at both ends of the detection side resistive film 13 in the X-direction or in the left-end electrode 18a and the right-end electrode 18b so that the sides at both ends of the detection side resistive film 13 in the X-direction may be electrically connected to the left-end electrode 18a and the right-end electrode 18b.

The sides at both ends of the rear resistive film 14 on the rear transparent substrate 12 in the X-direction are located inside the seal portion (on the side of the touch area 29). The upper-end electrode 19a and the lower-end electrode 19b formed on the sides at both ends in the Y-direction are formed in the vicinity of the seal portion.

The gap between the detection side transparent substrate 11 and the rear transparent substrate 12 and surrounded by the seal member 24 is filled with the insulating liquid 28. To fill the gap with the insulating liquid, first, the liquid injection opening 26 is immersed in the bath of the insulating liquid 28 in a vacuum chamber. Next, the inside of the chamber is returned to atmospheric pressure. As a result, a produced pressure difference between inside and outside of the gap is used to fill the gap with the insulating liquid 28. The liquid injection opening 26 is sealed with a sealing resin 27 after the gap is filled with the insulating liquid 28.

The insulating liquid 28 is a transparent liquid have a light refractive index which is almost same as that of transparent substrate 11, the rear transparent substrate 12, the detection side resistive film 13 and the rear resistive film 14. The difference of refractive index is desirably, for example, 0.1 or less. For example, when the refractive index of the detection side transparent substrate 11, the rear transparent substrate 12, the detection side resistive film 13 and the rear resistive film 14 is about 1.5, the refractive index of the insulating liquid 28 ranges, for example, between 1.4 and 1.5.

Specifically, liquid crystal optically isotropic at room temperature, such as liquid crystal showing an isotropic phase at a temperature of 5° C. or more (nematic liquid crystal having an N-I point below 5° C.) is used as the insulating liquid 28. More specifically, an example of liquid crystal having such characteristics is a liquid crystal material which has two to three cyclohexane or benzene rings, and an alkyl group at both ends thereof and which does not have dielectric constant anisotropy.

As the insulating liquid 28, an organic or inorganic insulating liquid substance having a boiling point of 100° C. or more can also be used. Specifically, it is possible to use an organic liquid substance such as butanol, toluene, xylene, isobutyl alcohol, isopentyl alcohol, isobutyl acetate, butyl acetate, tetrachlorethylene, methyl isobutyl ketone, methyl butyl ketone, ethylene glycol monoether, ethylene glycol monoether acetate, ethylene glycol monobutyl ether, ethylene glycol monomethyl ether or turpentine oil. Alternatively, it is possible to use an inorganic liquid substance such as silicone oil.

The shape of the detection side resistive film 13 is further described in detail here. As has been briefly described above, when the touch panel 10 is pressed from the side of the detection side transparent substrate 11, the detection side transparent substrate 11 bends, and the detection side resistive film 13 on the top of the protrusion 15 comes into contact with the rear resistive film 14 on the rear transparent substrate 12 at the pressed portion. On the basis of the resulting electrical conduction, the pressed position is detected.

Figure 6A:
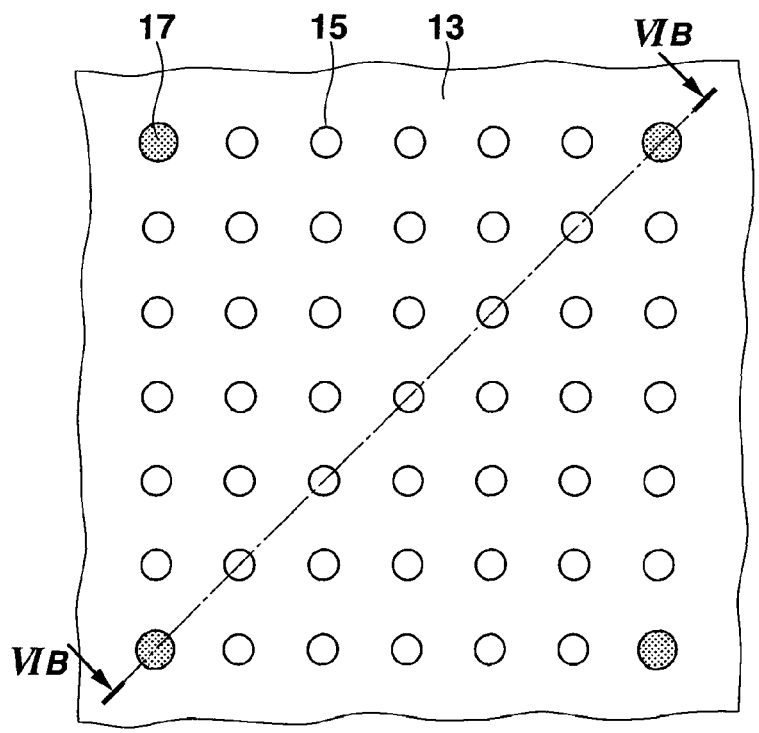
FIG. 6A is a planar view showing an example of the protrusions, the insulating spacers and a transparent electrode in the touch panel.
Figure 6B:
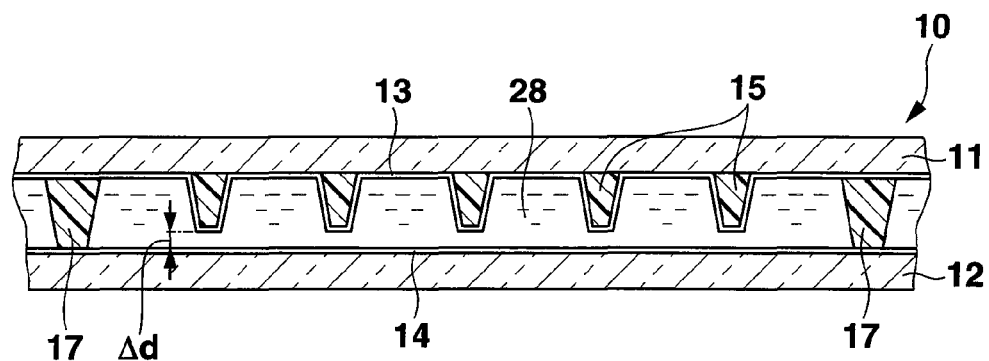
FIG. 6B is a sectional view showing an example of portion VIB-VIB in FIG. 6A.
Figure 7:
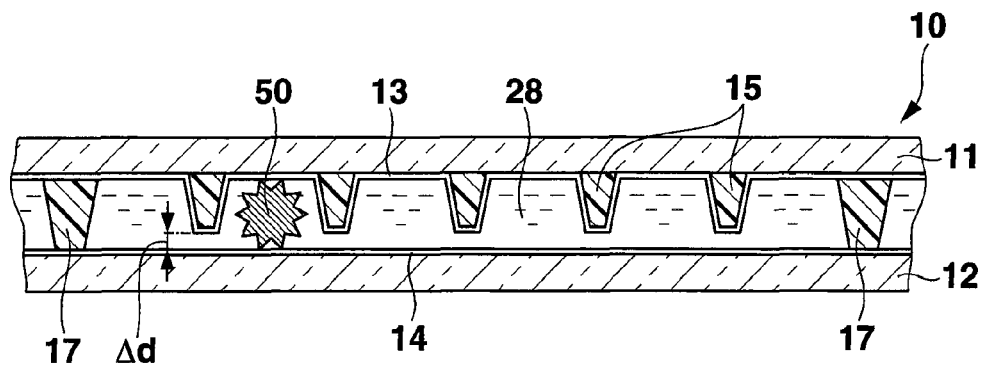
FIG. 7 is a diagram illustrating the touch panel shown in FIGS. 6A and 6B in which a foreign object is contained.

Here, there is shown in FIG. 6A the shape of the detection side resistive film 13 and the relation between the protrusions 15 and the insulating spacers 17 regarding the positions on a plane when the detection side resistive film 13 and the rear resistive film 14 are formed all over the surface. A sectional view of the portion of the touch panel indicated by VIB-VIB in FIG. 6A is shown in FIG. 6B. In the case of the configuration shown in FIGS. 6A and 6B, if there is a conducting foreign object 50 between the detection side transparent substrate 11 and the rear transparent substrate 12 as shown in FIG. 7, the detection side resistive film 13 and the rear resistive film 14 cause an electrical short circuit in this part, leading to an erroneous detection of pressing at this short-circuited position. Moreover, because of a later-described position detection principle, the detection side resistive film 13 and the rear resistive film 14 need to have a relatively high resistance to improve the resolving power. Therefore, when, for example, ITO films are used as these resistive films, the thickness of these films may have to be 100 Å or less. When the thickness is significantly small as described above, the detection side resistive film 13 or the rear resistive film 14 may be damaged during a manufacturing process or during the use of the touch panel.

Figure 8A:
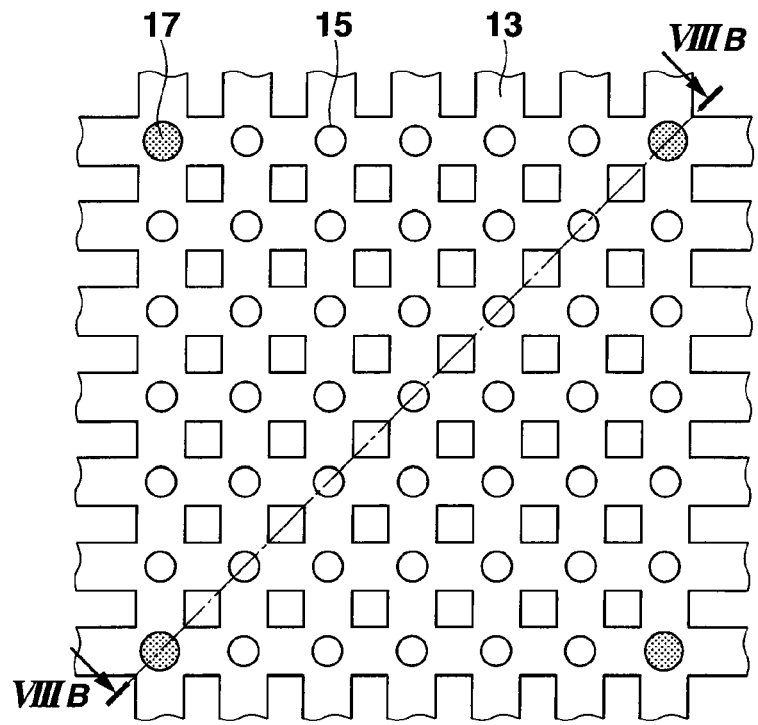
FIG. 8A is a planar view illustrating an example of the arrangement of the protrusions, the insulating spacers and the transparent electrode in the touch panel according to the embodiment of the present invention.
Figure 8B:
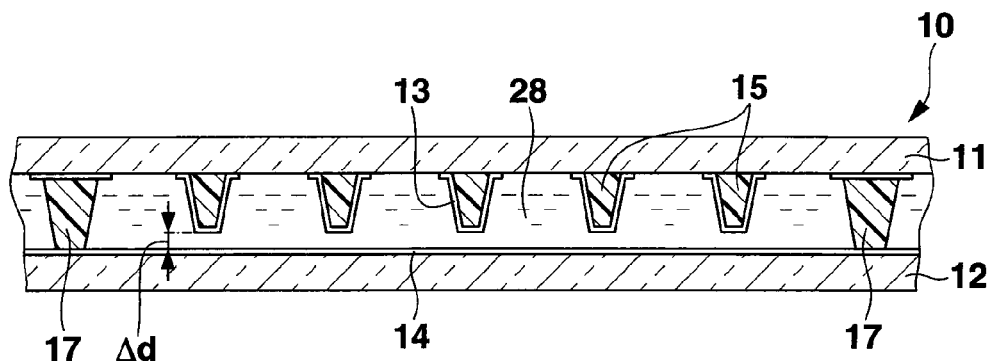
FIG. 8B is a sectional view showing an example of portion VIIIB-VIIIB in FIG. 8A.

Thus, in this embodiment, as shown in FIGS. 8A and 8B, the detection side resistive film 13 is lattice-shaped so that the detection side resistive film 13 is present on the protrusions 15 and under the insulating spacers 17 and has void regions in parts of other areas where the detection side resistive film 13 is absent. In other words, the detection side resistive film 13 has square void regions. The rear resistive film 14 on the rear transparent substrate 12 is formed all over the surface.

Figure 9:
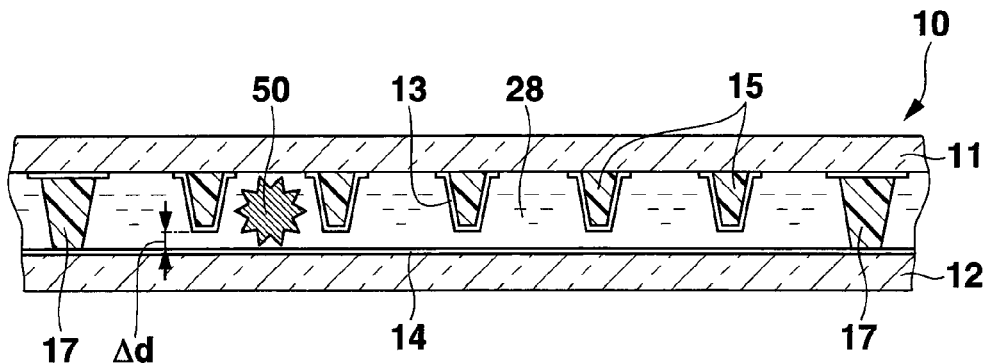
FIG. 9 is a diagram illustrating the touch panel shown in FIGS. 8A and 8B in which a foreign object is contained.

In such a configuration as well, since the detection side resistive film 13 is formed on the protrusions 15, when the detection side transparent substrate 11 is pressed from the outer side and bends, conduction is permitted between the detection side resistive film 13 and the rear resistive film 14, and the pressed position can be detected. On the other hand, even if the conducting foreign object 50 is present between the detection side transparent substrate 11 and the rear transparent substrate 12 as shown in FIG. 9, there is no electrical conduction, resulting in that the probability of erroneous detection is lower. For example, when the area where the detection side resistive film 13 is formed accounts for 50 percent of the total, the probability of erroneous detection is reduced by half.

Furthermore, since the area where the detection side resistive film 13 is absent is provided in part of the detection side transparent substrate 11, electrical resistance is increased accordingly. Thus, the thickness of the detection side resistive film 13 and the rear resistive film 14 that need to be highly resistive to improve the resolving power for position detection as described above can be greater than when the detection side resistive film 13 is formed all over the surface. For example, when the area where the detection side resistive film 13 is formed accounts for 50 percent of the total, the thickness of the detection side resistive film 13 can be two times. Therefore, the probability of the detection side resistive film 13 or the rear resistive film 14 being damaged during a manufacturing process or during the use of the touch panel can be decreased.

Figure 10:
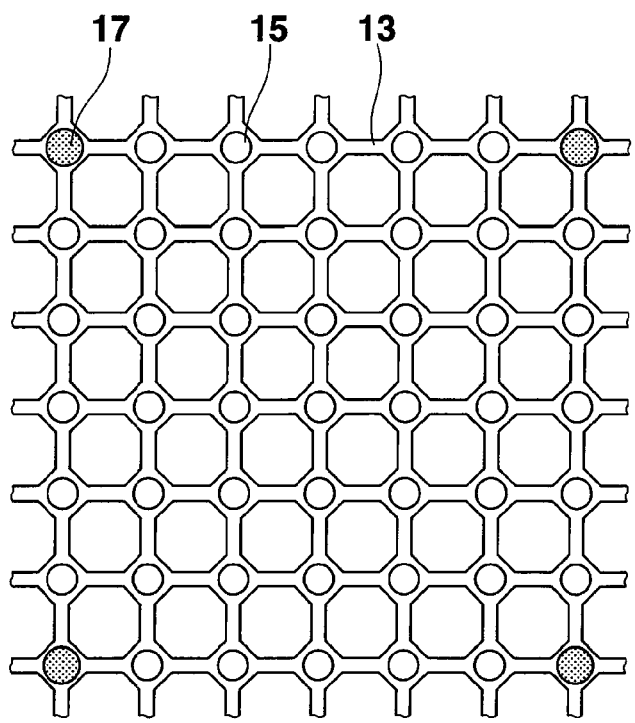
FIG. 10 is a diagram illustrating an example of the arrangement of the protrusions, the insulating spacers and the transparent electrode in the touch panel according to the embodiment of the present invention.
Figure 11:
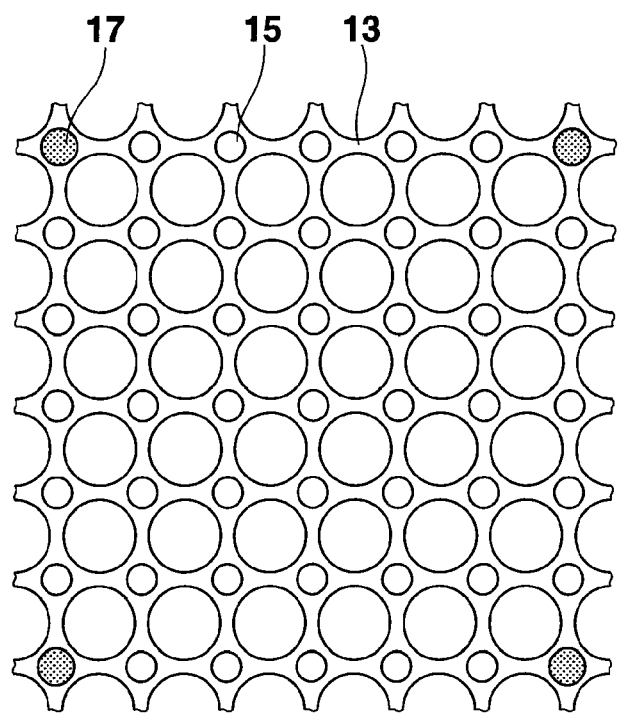
FIG. 11 is a diagram illustrating an example of the arrangement of the protrusions, the insulating spacers and the transparent electrode in the touch panel according to the embodiment of the present invention.
Figure 12:
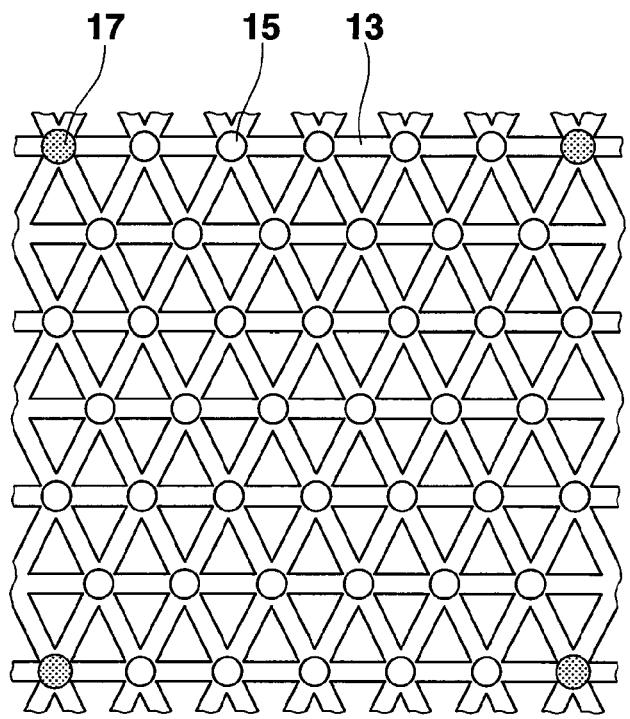
FIG. 12 is a diagram illustrating an example of the arrangement of the protrusions, the insulating spacers and the transparent electrode in the touch panel according to the embodiment of the present invention.
Figure 13:
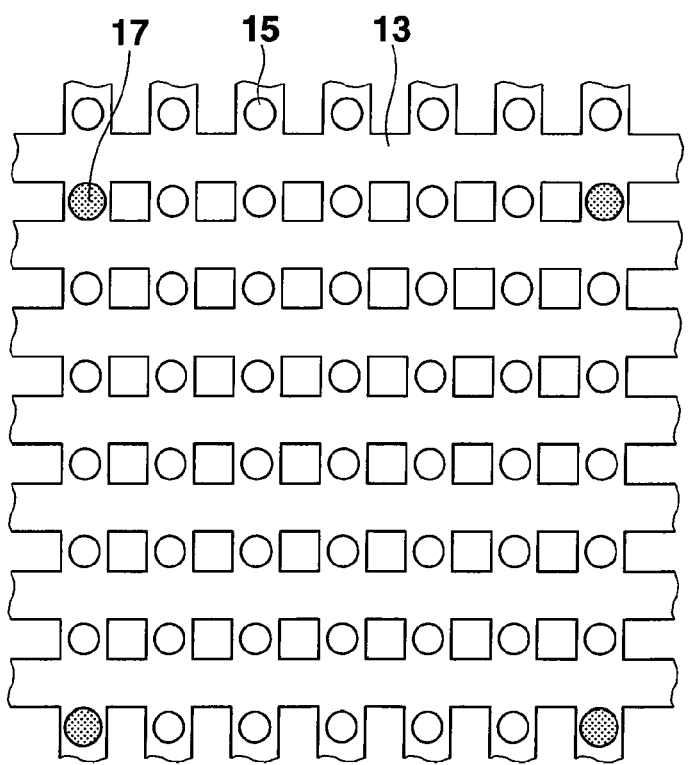
FIG. 13 is a diagram illustrating an example of the arrangement of the protrusions, the insulating spacers and the transparent electrode in the touch panel according to the embodiment of the present invention.

In the example shown in FIG. 8A, the detection side resistive film 13 is lattice-shaped, so that the protrusions 15 and the insulating spacers 17 are located at the intersections of the lattice, and the detection side resistive film 13 has the square void regions therein. However, the detection side resistive film 13 is not limited to such a configuration. For example, as shown in FIG. 10, the void regions can be polygonal. Alternatively, as shown in FIG. 11, the void regions can be shaped to have a curve (e.g., circle). Moreover, instead of being arrayed in the vertical and horizontal directions, the protrusions 15 and the insulating spacers 17 may be arranged to alternate in the vertical direction to provide triangular void regions as shown in FIG. 12. The triangle of the void region may be an equilateral triangle. Moreover, the protrusions 15 and the insulating spacers 17 may be located at any positions other than intersections of the lattice of the detection side resistive film 13 as shown in FIG. 13 by way of example as long as the detection side resistive film 13 is formed at such positions. In each case, the advantage is that the probability of erroneous detection is reduced and the probability of the detection side resistive film 13 or the rear resistive film 14 being damaged is reduced.

As described above, the detection side transparent substrate 11, for example, functions as the first transparent substrate which is pressed and thereby bends. The rear transparent substrate 12, for example, functions as the second transparent substrate facing the first transparent substrate. The protrusion 15, for example, functions as a protrusion formed in a protrusion formation surface. The detection side resistive film 13, for example, functions as the first resistive film formed in the protrusion formation surface. The rear resistive film 14, for example, functions as the second resistive film in a protrusion facing surface. The insulating spacers 17, for example, functions as insulating spacers which set a given distance between first contact regions and second contact regions to set a gap between the first contact regions and the second contact regions when the first transparent substrate is not pressed, and to allow the first contact regions and the second contact regions to be in contact with each other when the first transparent substrate is pressed. The seal member 24, for example, functions as a frame-shaped seal member for circumferentially bonding the first transparent substrate and the second transparent substrate together. The insulating liquid 28, for example, functions as an insulating liquid hermetically contained in the space surrounded by the first transparent substrate, the second transparent substrate and the seal member. The upper-end electrode drive circuit connecting terminal 21a, the lower-end electrode drive circuit connecting terminal 21b, the left-end electrode drive circuit connecting terminal 20a and the right-end electrode drive circuit connecting terminal 20b, for example, function as drive circuit connecting terminals for connecting both ends of the first resistive film in a first axial direction and both ends of the second resistive film in a second axial direction to the touch panel drive circuit. The left-end electrode 18a and the right-end electrode 18b, for example, function as a plurality of first connection electrodes that face both sides at both ends of the first resistive film in the first axial direction, respectively. The upper-end electrode 19a and the lower-end electrode 19b, for example, function as a plurality of second connection electrodes that are formed on both sides at both ends of the second resistive film in the second axial direction, respectively. The conducting particles 25, for example, functions as the conducting members or conducting particles for electrically connecting the first connection electrodes to the first resistive film.

Figure 14:
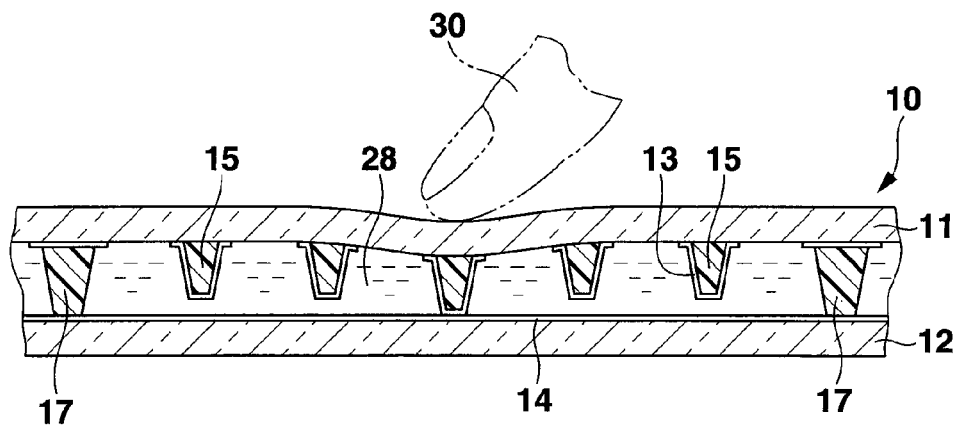
FIG. 14 is a sectional view showing an example of the touch panel according to the embodiment of the present invention when the touch panel is partially pressed.

Now, the operation of the touch panel 10 according to this embodiment is described. When the touch panel 10 is pressed by, for example, a fingertip 30 from the side of the detection side transparent substrate 11, the detection side transparent substrate 11 bends toward the rear transparent substrate 12 as shown in FIG. 14. Accordingly, the detection side resistive film 13 on the top of the protrusion 15 located in the bent part comes into contact with the rear resistive film 14 on the rear transparent substrate 12. As a result, electrical conduction is permitted in the part where the detection side resistive film 13 and the rear resistive film 14 are in contact. In FIG. 14, the scales of the protrusion 15 and the like are emphasized and greater than actual scales for the sake of simplicity, and the detection side resistive film 13 on one protrusion 15 comes into contact with the rear resistive film 14 when the touch panel is pressed by the fingertip from the side of the detection side transparent substrate 11. However, the same holds true with the following explanation when the detection side resistive film 13 on a plurality of protrusions 15 comes into contact with the rear resistive film 14.

Figure 15:
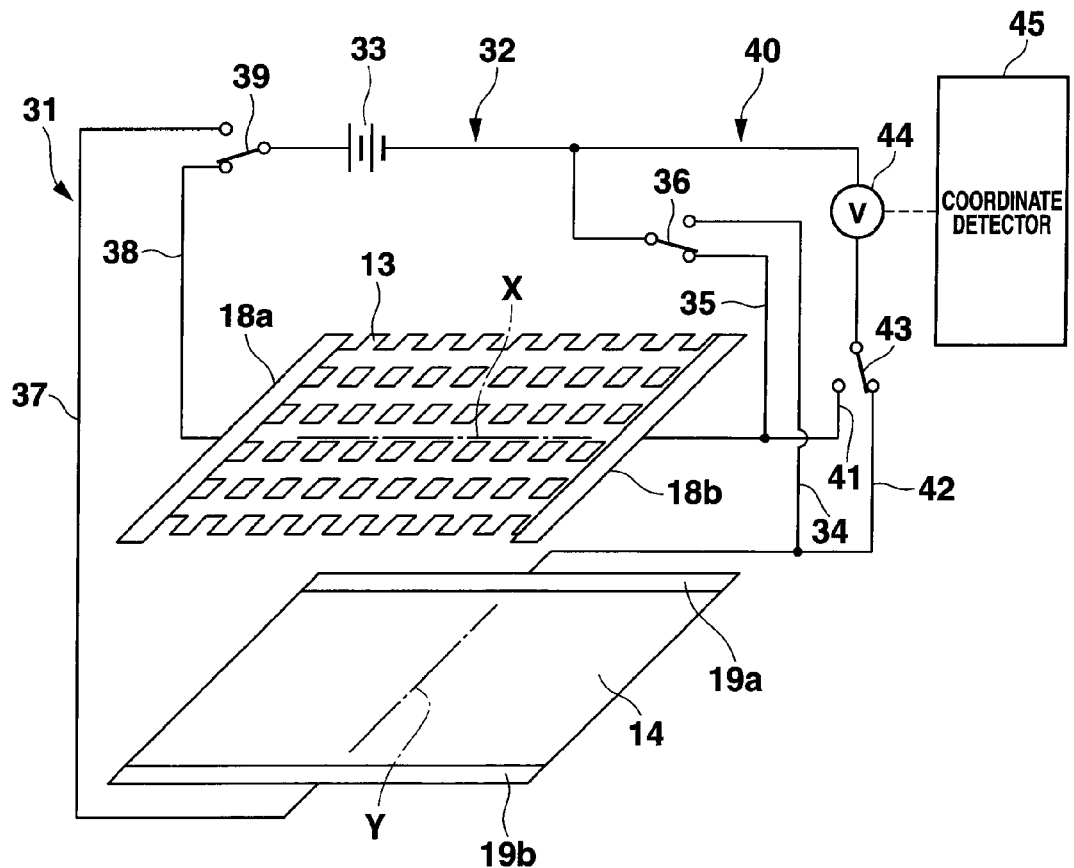
FIG. 15 is a diagram showing an example of a drive circuit of the touch panel according to the embodiment of the present invention.

As shown in FIG. 15, a touch panel drive circuit 31 comprises a voltage applying circuit 32, a voltage measurement system 40 and coordinate detector 45. The voltage applying circuit 32 alternately applies a voltage having a given magnitude across both ends of the detection side resistive film 13 in the X-direction and across both ends of the rear resistive film 14 in the Y-direction. The voltage measurement system 40 measures a voltage produced across a predetermined point on the voltage applying circuit 32 and one end of the detection side resistive film 13 in the X-direction or one end of the rear resistive film 14 in the Y-direction when conduction is permitted between the detection side resistive film 13 on the top of the protrusion 15 in the bent portion of the detection side transparent substrate 11 and the rear resistive film 14. The coordinate detector 45 detects coordinates of the touched point on the basis of a measured value of the voltage measurement system 40.

The voltage applying circuit 32 includes a constant voltage power supply 33. A first connection changeover switch 36 for selectively supplying a voltage to one of an X-axial first resistive film interconnect 35 and a Y-axial first resistive film interconnect 34 is connected to one side (negative side in FIG. 15) of the constant voltage power supply 33. The X-axial first resistive film interconnect 35 is connected, via the right-end electrode drive circuit connecting terminal 20b, to the right-end electrode 18b which is connected to one end of the detection side resistive film 13 in the X-direction. The Y-axial first resistive film interconnect 34 is connected, via the upper-end electrode drive circuit connecting terminal 21a, to the upper-end electrode 19a which is connected to one end of the rear resistive film 14 in the Y-direction.

A second connection changeover switch 39 for selectively supplying a voltage to one of an X-axial second resistive film interconnect 38 and a Y-axial second resistive film interconnect 37 is connected to the other side (positive side in FIG. 15) of the constant voltage power supply 33. The X-axial second resistive film interconnect 38 is connected, via the left-end electrode drive circuit connecting terminal 20a, to the left-end electrode 18a which is connected to one end of the detection side resistive film 13 in the X-direction. The Y-axial second resistive film interconnect 37 is connected, via the lower-end electrode drive circuit connecting terminal 21b, to the lower-end electrode 19b which is connected to one end of the rear resistive film 14 in the Y-direction. Although the constant voltage power supply 33 shown in FIG. 15 is a direct-current power supply, the constant voltage power supply 33 may be a power supply for supplying an alternating voltage.

The voltage measurement system 40 has voltage measurement device 44. A third connection changeover switch 43 for changing the connection of an X-axial third resistive film interconnect 41 and a Y-axial third resistive film interconnect 42 is connected to one end of the voltage measurement device 44. The X-axial third resistive film interconnect 41 and the Y-axial third resistive film interconnect 42 are connected to the X-axial first resistive film interconnect 35 and the Y-axial first resistive film interconnect 34, respectively. The other end of the voltage measurement device 44 is connected between one side (negative side in FIG. 15) of the constant voltage power supply 33 and the first connection changeover switch 36.

The voltage applying circuit 32 can switch the first connection changeover switch 36 and the second connection changeover switch 39 at a preset period, for example, a period of 0.1 seconds by unshown controller into a first condition (condition in FIG. 15) or a second condition. In the first condition, the constant voltage power supply 33 is connected to both ends of the detection side resistive film 13 in the X-direction. In the second condition, the constant voltage power supply 33 is connected to both ends of the rear resistive film 14 in the Y-direction. In this way, a voltage of the constant voltage power supply 33 having a given magnitude is alternately applied across both ends of the detection side resistive film 13 in the X-direction and across both ends of the rear resistive film 14 in the Y-direction.

The coordinate detector 45 is also controlled by the unshown controller. The third connection changeover switch 43 is connected to the Y-axial third resistive film interconnect 42 when the first connection changeover switch 36 and the second connection changeover switch 39 are in the first condition. The third connection changeover switch 43 is connected to the X-axial third resistive film interconnect 41 when the first connection changeover switch 36 and the second connection changeover switch 39 are in the second condition. The coordinate detector 45 detects coordinates of the pressed point in the X-direction (hereinafter referred to as the X-coordinates) on the basis of a measured value of the voltage measurement device 44 in the first condition, that is, when a voltage is applied across both ends of the detection side resistive film 13 in the X-direction. The coordinate detector 45 detects coordinates of the pressed point in the Y-direction (hereinafter referred to as the Y-coordinates) on the basis of a measured value of the voltage measurement device 44 in the second condition, that is, when a voltage is applied across both ends of the rear resistive film 14 in the Y-direction.

Calculation associated with the detection of the X- and Y-coordinates of the pressed point based on the measured value of the voltage measurement device 44 is described. When a voltage V0 is applied across both ends of the detection side resistive film 13 in the X-direction, since rx<<R where rx denotes the resistance across both ends of the detection side resistive film 13 in the X-direction and R denotes the internal resistance of the voltage measurement device 44, a measured voltage V(x) of the voltage measurement device 44 can be represented by $$V(x)=V0(1-x),$$

wherein V0 denotes the voltage of the constant voltage power supply 33, 0 denotes the X-coordinate of one end of the detection side resistive film 13 in the X-direction, 1 denotes the X-coordinate of the other end of the detection side resistive film 13 in the X-direction, and x denotes X-coordinates of the pressed point.

Similarly, when a voltage V0 is applied across both ends of the rear resistive film 14 in the Y-direction, since ry<<R where ry denotes the resistance across both ends of the rear resistive film 14 in the Y-direction, a measured voltage V(y) of the voltage measurement device 44 can be represented by $$V(y)=V0(1-y),$$

wherein 0 denotes the Y-coordinate of one end of the rear resistive film 14 in the Y-direction, 1 denotes the Y-coordinate of the other end of the rear resistive film 14 in the Y-direction, and y denotes Y-coordinates of the pressed point.

Consequently, the X-coordinates x and the Y-coordinates y of the pressed point can be found by $$x=1-V(x)/V0,$$

$$y=1-V(y)/V0.$$

The left-end electrode 18a and the right-end electrode 18b having a continuous stripe is provided over the entire length of the sides at both ends of the detection side resistive film 13 in the X-direction. The upper-end electrode 19a and the lower-end electrode 19b having a continuous stripe is provided over the entire length of the sides at both ends of the rear resistive film 14 in the Y-direction. Therefore, the voltage alternately applied by the touch panel drive circuit 31 across both ends of the detection side resistive film 13 in the X-direction and across both ends of the rear resistive film 14 in the Y-direction can act equally on the whole area of the detection side resistive film 13 and the rear resistive film 14. As a result, according to the touch panel 10 of this embodiment, the X-coordinates x and Y-coordinates y of the pressed point can be highly accurately detected.

The touch-panel-equipped display device shown in FIG. 1 is capable of, for example, keyboard-like touch input, wherein a plurality of key patterns are displayed on the display panel 1, and parts corresponding to the key patterns in the touch panel 10 are selectively touched. The touch-panel-equipped display device is also capable of, for example, input for image selection, wherein an image is displayed on the display panel 1, and a given point on the touch panel 10 is touched so that an enlarged image centered on the touched point is displayed on the display panel 1. The touch-panel-equipped display device is also capable of, for example, input for scroll, wherein an image is displayed on the display panel 1, and a touched point is moved in a given direction on the touch panel 10 to scroll the image displayed on the display panel 1.

In the touch panel 10, the detection side transparent substrate 11 is pressed from the outer side and thereby bends so that local conduction is permitted between the detection side resistive film 13 and the rear resistive film 14 inside the rear transparent substrate 12 in a part corresponding to the pressed point via the top of the protrusion 15. Therefore, the bending amount of the detection side transparent substrate 11 necessary for the local conduction between the detection side resistive film 13 and the rear resistive film 14 can be sufficiently smaller than the gap between the detection side transparent substrate 11 and the rear transparent substrate 12. As described above, when the height of the protrusion 15 is 2.0 µm, the height of the insulating spacer 17 is 2.5, 3.0 or 4.0 µm. In this case, the gap Δd between the detection side resistive film 13 on the top of the protrusion 15 and the rear resistive film 14 on the rear transparent substrate 12 is 0.5, 1.0 or 2.0 µm, respectively. Therefore, the bending of the detection side transparent substrate 11 in the gap direction necessary for the detection of the pressing is 0.5, 1.0 or 2.0 µm, and is significantly small. Thus, the refraction of transmitted light due to the bending of the detection side transparent substrate 11 caused by pressing can be reduced. Consequently, according to the touch panel 10 of the embodiment, the touch-panel-equipped display device shown in FIG. 1 can display an image with almost no distortion therein even in the region where the detection side transparent substrate 11 is pressed.

Moreover, the insulating liquid 28 is hermetically contained in the gap between the detection side transparent substrate 11 and the rear transparent substrate 12. Therefore, the reflection and refraction of light penetrating the touch panel 10 can be reduced at the interface between the detection side transparent substrate 11 or the rear transparent substrate 12 and the insulating liquid 28. Consequently, according to the touch panel 10 of the embodiment, the touch-panel-equipped display device shown in FIG. 1 can display an image with sufficient brightness.

The differences of light refractive index between the insulating liquid 28, and the detection side transparent substrate 11, the rear transparent substrate 12, the detection side resistive film 13 as well as the rear resistive film 14 are desirably 0.1 or less. When the insulating liquid 28 having such a refractive index is hermetically contained, the reflection and refraction at the interface between the detection side transparent substrate 11 or the rear transparent substrate 12 and the insulating liquid 28 can be more effectively reduced.

Furthermore, the insulating liquid 28 is desirably liquid crystal optically isotropic at room temperature, such as liquid crystal showing an isotropic phase at a temperature of 5° C. or more. When the insulating liquid 28 having such a refractive index is hermetically contained, the reflection and refraction at the interface between the detection side transparent substrate 11 or the rear transparent substrate 12 and the insulating liquid 28 can be more effectively reduced.

Since the detection side resistive film 13 is formed to cover the protrusions 15 which is a transparent insulator, transmitted light is not shut by protruding contacts, in contrast with the case where a plurality of protruding contacts are formed on the detection side resistive film 13 by a conductive metal. Consequently, according to the touch panel 10 of the embodiment, the touch-panel-equipped display device shown in FIG. 1 can display an image without any black spots caused by blocking of light.

In this embodiment, the detection side resistive film 13 on the detection side transparent substrate 11 is shaped so that the detection side resistive film 13 is present on the protrusions 15 and under the insulating spacers 17 and has void regions in other areas where the detection side resistive film 13 is absent, as shown in FIGS. 8A and 8B, 10, 11, 12 or 13. Therefore, even if the conducting foreign object 50 is present between the detection side transparent substrate 11 and the rear transparent substrate 12 as shown in FIG. 9, the probability of erroneous detection due to an electrical short circuit caused by the foreign object 50 between the detection side resistive film 13 and the rear resistive film 14 is reduced. Moreover, as the region where the detection side resistive film 13 is absent is provided in part of the detection side transparent substrate 11, electrical resistance is increased, and the thickness of the detection side resistive film 13 and the rear resistive film 14 that need to be highly resistive to improve the resolution for position detection can be greater. The increase of the thickness reduces the probability of the detection side resistive film 13 or the rear resistive film 14 being damaged during a manufacturing process or during the use of the touch panel.

First Modification

A first modification of the embodiment is described. Here, the difference between this modification and the previous embodiment is described. The same components as those in the above embodiment are provided with the same reference signs and are not described.

Figure 16:
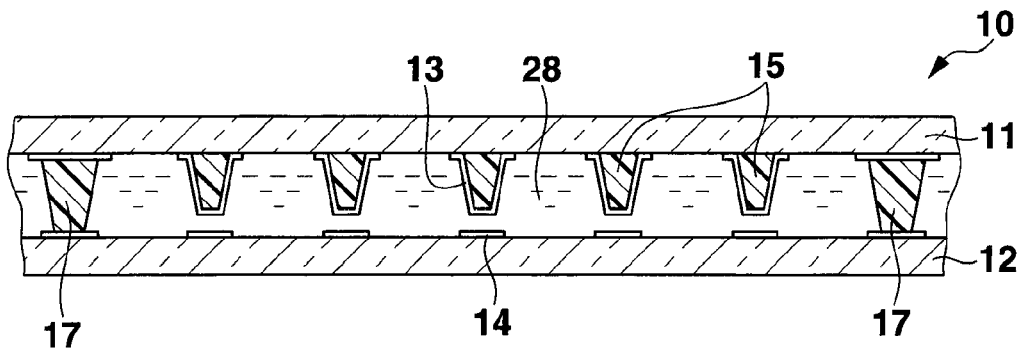
FIG. 16 is an enlarged sectional view of an example of a touch panel according to a first modification of the embodiment of the present invention.

In the embodiment described above, the detection side resistive film 13 as the first resistive film is formed to have a lattice shape in the region including the parts where the protrusions 15 and the insulating spacers 17 are located, while the rear resistive film 14 as the second resistive film is solidly formed all over the surface. In this modification, as shown in FIG. 16 which is a diagram corresponding to FIG. 8B for illustrating the embodiment described above, the rear resistive film 14 as the second resistive film is also formed to have a lattice shape in the region including the parts where the protrusions 15 and the insulating spacers 17 are located, similarly to the detection side resistive film 13. Moreover, the rear resistive film 14 has square void regions. The configuration in this modification is the same as that in the embodiment described above in other respects.

A touch panel 10 having such a configuration can also provide advantages similar to the advantages in the embodiment described above.

Furthermore, as in the detection side resistive film 13 according to the embodiment described above, the void regions are not exclusively square, and can be, for example, polygonal similarly to the void region shown in FIG. 10. The void regions can otherwise be shaped to have a curve (e.g. circles) similarly to the void regions shown in FIG. 11. The detection side resistive film 13 can otherwise have triangular void regions similar to the void regions shown in FIG. 12. Alternatively, as in FIG. 13, the protrusions 15 and the insulating spacers 17 may not be located at the intersections of the lattice of the detection side resistive film 13. In these cases as well, advantages similar to the advantages in the embodiment described above can be provided.

Second Modification

A second modification of the embodiment is described. Here, the difference between this modification and the previous embodiment is described. The same components as those in the above embodiment are provided with the same reference signs and are not described.

In the first modification, both the detection side resistive film 13 as the first resistive film and the rear resistive film 14 as the second resistive film are formed to have a lattice shape in the region including the parts where the protrusions 15 and the insulating spacers 17 are located, and have the void regions. In this modification, in contrast, the rear resistive film 14 as the second resistive film is formed to have a lattice shape in the region including the parts where the protrusions 15 and the insulating spacers 17 are located, while the detection side resistive film 13 is solidly formed all over the surface. The configuration in this modification is the same as that in the embodiment described above in other respects. In addition, the shape of the rear resistive film 14 can be varied as in the first modification.

The touch panel 10 having such a configuration can also provide advantages similar to the advantages in the embodiment described above.

Third Modification

A third modification of the embodiment is described. Here, the difference between this modification and the previous embodiment is described. The same components as those in the above embodiment are provided with the same reference signs and are not described.

Figure 17:
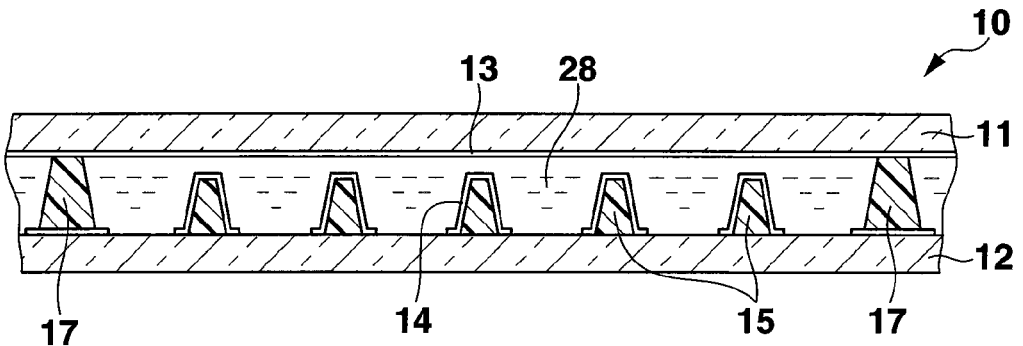
FIG. 17 is an enlarged sectional view of an example of a touch panel according to a third modification of the embodiment of the present invention.

In the embodiment described above, the protrusions 15 and the insulating spacers 17 are formed on the detection side transparent substrate 11. In this modification, in contrast, the protrusions 15 and the insulating spacers 17 are formed on the rear transparent substrate 12, as shown in FIG. 17 corresponding to FIG. 8B for illustrating the embodiment described above. The configuration in this modification is the same as that in the embodiment described above in other respects.

In this modification, the rear resistive film 14 formed to cover the protrusions 15 serves as the first resistive film, and the detection side resistive film 13 formed on the detection side transparent substrate 11 in which the protrusions 15 are not formed serves as the second resistive film. This modification is an example wherein the rear resistive film 14 which is the first resistive film has void regions.

A touch panel 10 having such a configuration can also provide advantages similar to the advantages in the embodiment described above.

Fourth Modification

A fourth modification of the embodiment is described. Here, the difference between this modification and the previous embodiment is described.

The same components as those in the above embodiment are provided with the same reference signs and are not described.

Figure 18:
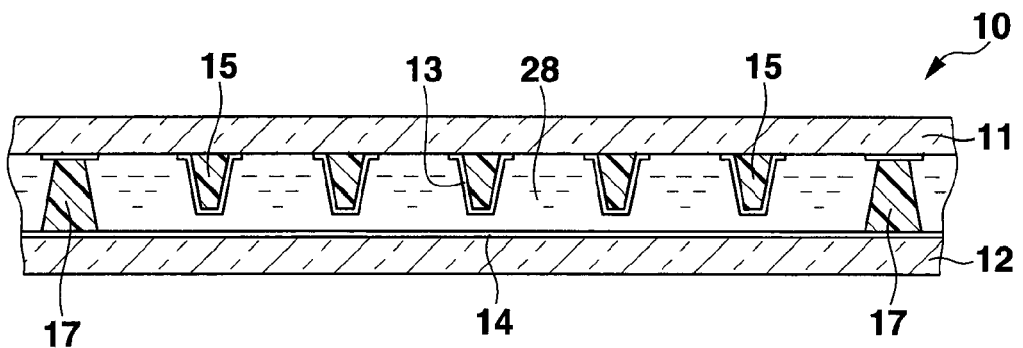
FIG. 18 is an enlarged sectional view of an example of a touch panel according to a fourth modification of the embodiment of the present invention.

In the embodiment described above, the protrusions 15 and the insulating spacers 17 are formed on the detection side transparent substrate 11. In this modification, in contrast, the protrusions 15 are formed on the detection side transparent substrate 11, and the insulating spacers 17 are formed on the rear transparent substrate 12, as shown in FIG. 18 corresponding to FIG. 8B for illustrating the embodiment described above. The configuration in this modification is the same as that in the embodiment described above in other respects.

Alternatively, the protrusions 15 may be formed on the rear transparent substrate 12, and the insulating spacers 17 may be formed on the detection side transparent substrate 11.

A touch panel 10 having such a configuration can also provide advantages similar to the advantages in the embodiment described above.

Fifth Modification

A fifth modification of the embodiment is described. Here, the difference between this modification and the previous embodiment is described. The same components as those in the above embodiment are provided with the same reference signs and are not described.

Figure 19:
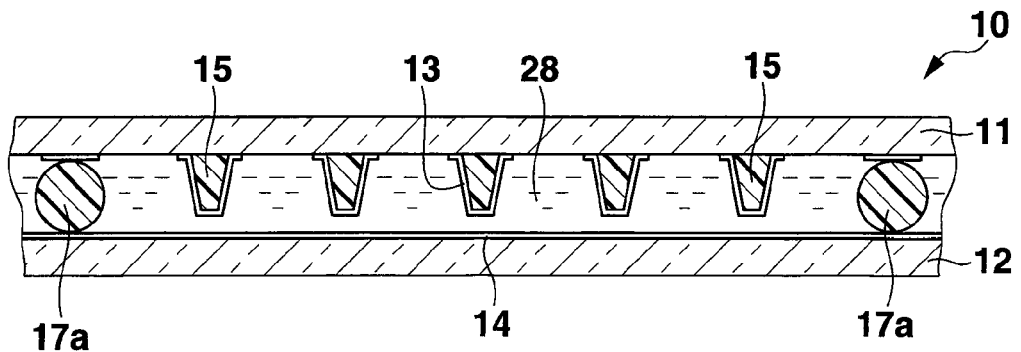
FIG. 19 is an enlarged sectional view of an example of a touch panel according to a fifth modification of the embodiment of the present invention.

In this modification, instead of a plurality of columnar insulating spacers 17, a plurality of spherical insulating spacers 17a which are greater in height than the protrusions 15 and which have a diameter corresponding to the height of the insulating spacers 17 are arranged to avoid a plurality of protrusions 15, as shown in FIG. 19 corresponding to FIG. 8B for illustrating the embodiment described above. The gap between the detection side transparent substrate 11 and the rear transparent substrate 12 is set to be greater than the height of the protrusions 15 by the spherical insulating spacers 17a. The configuration in this modification is the same as that in the embodiment described above in other respects.

In this way, for example, the spherical insulating spacers 17a function as spherical spacers held between the first resistive film and the second resistive film.

A touch panel 10 having such a configuration can also provide advantages similar to the advantages in the embodiment described above.

Sixth Modification

A sixth modification of the embodiment is described. Here, the difference between this modification and the previous embodiment is described. The same components as those in the above embodiment are provided with the same reference signs and are not described.

In the embodiment described above, the upper-end electrode 19a, the lower-end electrode 19b, the left-end electrode 18a, the right-end electrode 18b, the upper-end electrode interconnect 23a, the lower-end electrode interconnect 23b, the left-end electrode interconnect 22a, the right-end electrode interconnect 22b, the upper-end electrode drive circuit connecting terminal 21a, the lower-end electrode drive circuit connecting terminal 21b, the left-end electrode drive circuit connecting terminal 20a and the right-end electrode drive circuit connecting terminal 20b are formed on the rear transparent substrate 12. On the contrary, in this modification, these electrodes, interconnects and terminals are formed on the detection side transparent substrate 11. In this case, for example, the left-end electrode 18a and the right-end electrode 18b are formed on the detection side resistive film 13. The upper-end electrode 19a and the lower-end electrode 19b are formed at positions that face the sides at the upper and lower ends of the rear resistive film 14. The upper-end electrode 19a and the lower-end electrode 19b are electrically connected to the sides at the upper and lower ends of the rear resistive film 14 by the conducting particles 25. Thus, the components are modified so that the touch panel 10 may operate. The configuration in this modification is the same as that in the embodiment described above in other respects.

A touch panel 10 having such a configuration can also provide advantages similar to the advantages in the embodiment described above.

Combination of Modifications

The modifications described above may be combined together. For example, the protrusions 15 and the insulating spacers 17 may be configured as in the third to fifth modifications. In each case, the detection side resistive film 13 and the rear resistive film 14 may be configured so that both the first resistive film (the detection side resistive film 13 in the first modification) and the second resistive film (the rear resistive film 14 in the first modification) have void regions, as in the first modification. Alternatively, as in the second modification, the first resistive film (the detection side resistive film 13 in the second modification) may have no void regions, and the second resistive film (the rear resistive film 14 in the second modification) may have void regions. Moreover, in each case, the various drive circuit connecting terminals may be formed on the detection side transparent substrate 11, as in the sixth modification.

Furthermore, the third modification may be combined with the fifth modification. Thus, the protrusions 15 are formed on the rear transparent substrate 12, and the spherical insulating spacers 17a are used. In this case as well, the detection side resistive film 13 and the rear resistive film 14 may be configured as in the first modification or the second modification. Moreover, in each case, the various drive circuit connecting terminals may be formed on the detection side transparent substrate 11, as in the sixth modification.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A touch panel comprising:
   a first transparent substrate;
   a second transparent substrate facing the first transparent substrate;
   protrusions formed on a protrusion formation surface, the protrusion formation surface being one of a surface of the first transparent substrate facing the second transparent substrate and a surface of the second transparent substrate facing the first transparent substrate;
   a first resistive film formed on the protrusion formation surface, the first resistive film covering the protrusions;
   a second resistive film formed on a protrusion facing surface, the protrusion facing surface being the other of the surface of the first transparent substrate facing the second transparent substrate and the surface of the second transparent substrate facing the first transparent substrate;
   insulating spacers which regulate a given distance between first contact regions and second contact regions to set a gap between the first contact regions and the second contact regions when the first transparent substrate is not pressed, and to allow the first contact regions and the second contact regions to be in contact with each other when the first transparent substrate is pressed, the first contact regions being parts of the first resistive film and including tops of the protrusions, the second contact regions being parts of the second resistive film and facing the first contact regions;
   a frame-shaped seal member which circumferentially bonds the first transparent substrate and the second transparent substrate together; and
   an insulating liquid contained in a space surrounded by the first transparent substrate, the second transparent substrate and the seal member,
   wherein:
   at least one of the first resistive film and the second resistive film has a lattice shape such that the corresponding one of the protrusion formation surface and the protrusion facing surface, on which said lattice-shaped resistive film is formed, includes a void region in which said lattice-shaped resistive film is not formed,
   the protrusions and the insulating spacers are located only at intersections of the lattice of said lattice-shaped resistive film, and
   the void region is neither the first contact region nor the second contact region, and is surrounded by said lattice-shaped resistive film.

2. The touch panel according to claim 1, wherein:
   the protrusions are arranged in a first axial direction defined in the protrusion formation surface and in a second axial direction defined in the protrusion formation surface, the second axial direction intersecting with the first axial direction,
   the first resistive film is formed in a domain including the first contact regions, a region including a segment which connects the first contact regions arranged in the first axial direction, and a region including a segment which connects the first contact regions arranged in the second axial direction, and
   the second resistive film is formed in a domain including the second contact regions, a region including a segment which connects the second contact regions arranged in the first axial direction, and a region including a segment which connects the second contact regions arranged in the second axial direction.

3. The touch panel according to claim 1, wherein the protrusion formation surface includes the void region, and the protrusion facing surface does not include the void region.

4. The touch panel according to claim 1, wherein the protrusion facing surface includes the void region, and the protrusion formation surface does not include the void region.

5. The touch panel according to claim 1, wherein each of the protrusion formation surface and the protrusion facing surface includes the void region.

6. The touch panel according to claim 1, wherein the void region is square.

7. The touch panel according to claim 1, wherein the void region is polygonal.

8. The touch panel according to claim 1, wherein the void region is shaped to be surrounded by a curve.

9. The touch panel according to claim 1, wherein the first transparent substrate includes the protrusion formation surface.

10. The touch panel according to claim 1, wherein the second transparent substrate includes the protrusion formation surface.

11. The touch panel according to claim 1, wherein:
    the protrusions are arranged in a first axial direction defined in the protrusion formation surface and in a second axial direction defined in the protrusion formation surface, the second axial direction intersecting with the first axial direction, and
    the first axial direction and the second axial direction are perpendicular to each other.

12. The touch panel according to claim 1, wherein:
    the protrusions are arranged in a first axial direction defined in the protrusion formation surface and in a second axial direction defined in the protrusion formation surface, the second axial direction intersecting with the first axial direction, and
    the first axial direction and the second axial direction make an angle of 60 degrees.

13. The touch panel according to claim 1, wherein the insulating spacers are columnar spacers which are formed on one of the first resistive film and the second resistive film, and which are in contact with the other of the first resistive film and the second resistive film.

14. The touch panel according to claim 13, wherein the columnar spacers are formed on a surface of the first resistive film.

15. The touch panel according to claim 13, wherein the columnar spacers are formed on the second resistive film.

16. The touch panel according to claim 1, wherein the insulating spacers are spherical spacers which are held between the first resistive film and the second resistive film.

17. The touch panel according to claim 1, wherein all differences of refractive index between each of the first transparent substrate, the second transparent substrate, the first resistive film, the second resistive film and the insulating liquid are 0.1 or less.

18. The touch panel according to claim 17, wherein the insulating liquid is liquid crystal optically isotropic at room temperature.

19. The touch panel according to claim 18, wherein the liquid crystal shows an isotropic phase at a temperature of 5° C. or more.

20. The touch panel according to claim 1,
wherein the protrusions are arranged in a first axial direction defined in the protrusion formation surface and in a second axial direction defined in the protrusion formation surface, the second axial direction intersecting with the first axial direction, and
wherein the touch panel further comprises:
a plurality of drive circuit connecting terminals, the drive circuit connecting terminals being formed on an edge of a terminal formation substrate which is one of the first transparent substrate and the second transparent substrate, the drive circuit connecting terminals being connected to both ends of the first resistive film in the first axial direction and both ends of the second resistive film in the second axial direction, respectively; and
a touch panel drive circuit connected to the drive circuit connecting terminals.

* * * * *